United States Patent Office 3,295,897
Patented Jan. 3, 1967

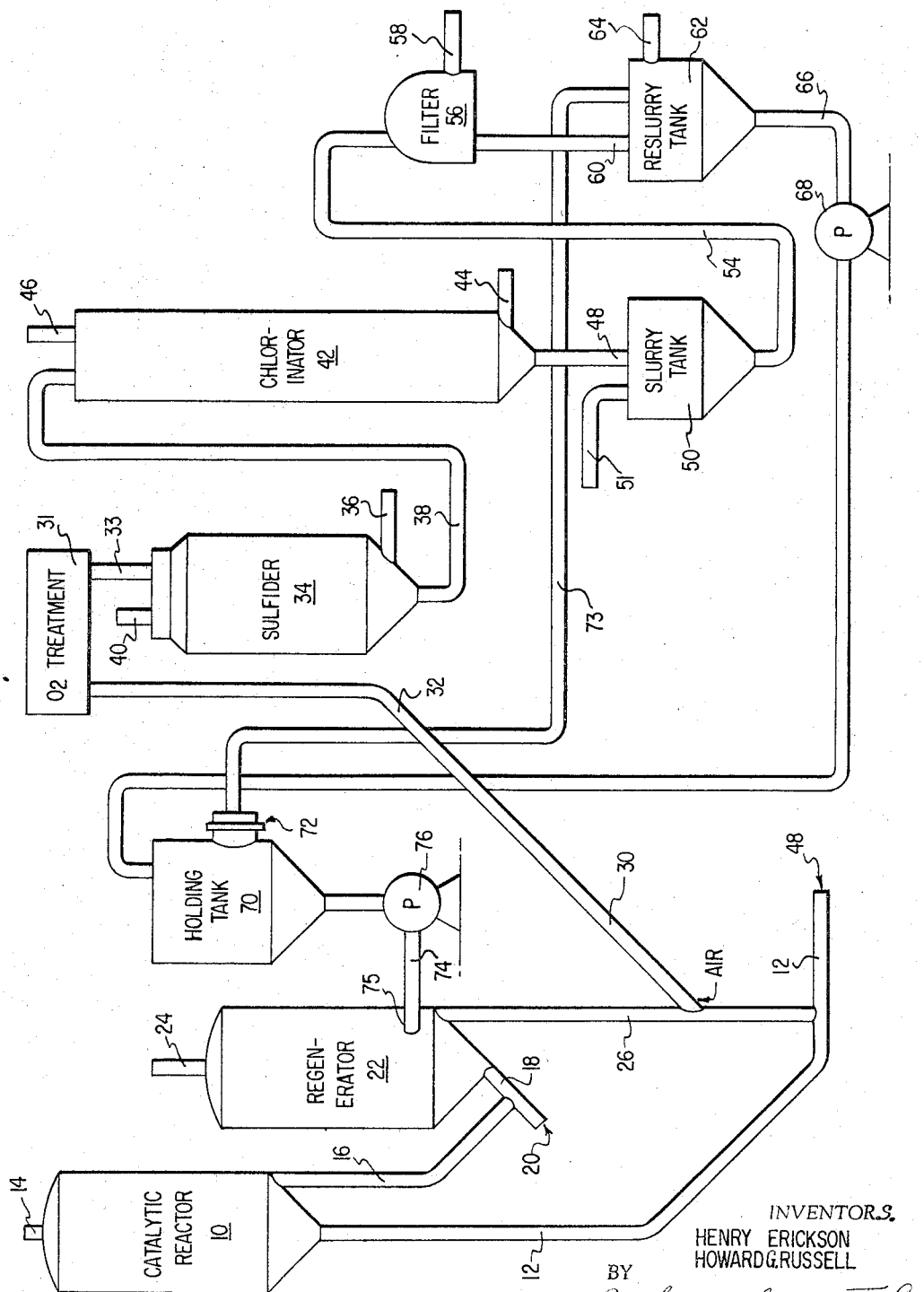

3,295,897
METHOD FOR TRANSFERRING A SLURRY OF CATALYSTS TO A REGENERATION ZONE
Henry Erickson, Park Forest, Ill., and Howard G. Russell, Munster, Ind., assignors to Sinclair Research, Inc., New York, N.Y., a corporation of Delaware
Filed Feb. 27, 1964, Ser. No. 347,760
3 Claims. (Cl. 302—66)

This invention is a method and apparatus for pumping a slurry of finely divided or fluidized solids into an elevated vessel and subsequently pumping the slurry from the elevated vessel to a vessel under pressure. In a specific embodiment, the present invention is a method and apparatus for returning catalyst to a catalytic cracking system by way of a catalyst regenerator, the catalyst being in the form of a slurry in water.

A slurry of finely divided solids may be obtained in many ways. For example, copending patent applications, Serial No. 86,444, filed February 1, 1961, now U.S. Patent No. 3,140,923, and Serial No. 55,160, filed September 12, 1960, now U.S. Patent No. 3,150,103, which are hereby incorporated by reference, describe procedures providing for the removal of the common metal poisons, e.g., iron, nickel and vanadium, from a contaminated hydrocarbon cracking catalyst. These procedures may involve pretreatment of the catalyst at elevated temperature with, for instance, one or both in sequence a molecular oxygen-containing gas and a vaporous sulfiding agent followed by contact of the catalyst at elevated temperatures with vapors reactive with the poisoning metal components and removal of poisoning metals with an aqueous medium, e.g. a basic aqueous wash containing ammonium ions is suitable for removal of vandium poisons. The removal of nickel may be accomplished by the use of a slightly acid, aqueous wash when the nickel is first converted into a compound dispersible in such a wash. A chlorination treatment can convert nickel to the soluble chloride form. Also, a poisoned catalyst may be reduced in nickel content by the aqueous wash when nickel contaminants are put into the sulfate or other dispersible forms by oxidizing sulfided nickel contaminated catalyst. Such an oxidation may be performed by an aqueous oxidizing agent. Thus, after the conversion of at least some of the poisoning metals to a form soluble or dispersible in an aqueous medium, the catalyst can be washed with such aqueous medium to remove metal sulfate, chloride or other soluble forms. After the wash treatment, the catalyst slurry can be filtered to give a cake which may be reslurried with water or rinsed in other ways, such as, for example, by a water wash on the filter, and the rinsing may be repeated, if desired, several times. After demetallization the catalyst is returned to the hydrocarbon conversion system.

Although commercial experience and trial has indicated that the use of water-solid catalyst slurry systems for re-introduction of finely divided catalyst to the conversion system have the advantage of giving the operator the ability to maintain closely-controlled flow rates and efficiency of transport, it has been found that, when significant pressures are encountered in the systems a significant problem is presented. The principle problem arises because of the fact that ordinary pumping units will not give satisfactory service due to erosive wear. Thus, when the abrasive catalyst slurry is pumped at substantial pressure to lift the slurry from essentially ground level, at which pressure it is convenient to conduct the washing operation, to the regenerator at an elevated position and under a pressure above atmospheric, severe erosion may occur in the pump, especially in the otherwise desirable centrifugal pump. Particularly, the impeller and the supporting pump casing normally suffer great erosive wear under these conditions. The erosion may be furthered by the speed and size of the pump impeller needed for the small volume, high pressure operation.

The present invention provides for two pumping units, virtually eliminating the aforementioned problem, i.e. one pump, usually a centrifugal or diaphragm pump, is used to lift a relatively thin catalyst-water slurry from a slurry tank at say grade or ground level to an elevated holding, de-watering tank, positioned above the point of entry of the catalyst in the regenerator while a second pump is used to inject a heavier slurry from the de-watering tank into the regenerator, thus eliminating erosive wear in either of the pumps without overloading the regenerator with water and steam which can deactivate the catalyst and produce higher gas velocities which may lead to excessive catalyst loss. Usually, the height difference between the slurry tank to the elevated, de-watering tank is at least 40 to 50 feet or more, and the de-watering tank is approximately 2 to 5 feet above the point at which catalyst enters the regenerator. Also, the pressure in the regenerator is at least 15–25 p.s.i. or more higher than that of the de-watering tank. The catalyst concentration in the initial slurry is about 2.5 to 9 parts of water per part of catalyst by weight. In the elevated holding, de-watering tank the density of the catalyst slurry is controlled to give a slurry having about 1.2 to 1.9 parts of water per part of catalyst by weight, and the amount of water removed in the de-watering tank is at least about 50% of that in the slurry entering the tank. The latter catalyst slurry from the de-watering tank is pumped into the catalyst regeneraor by means of a second pump, which may conveniently be a progressing-cavity pump.

Thus, in the method of this invention, the water content of the catalyst slurry is reduced in the elevated holding tank. This manner of operation, aside from avoiding severe pump wear, represents a substantial reduction of steam in the regenerator. Also the heat requirement for vaporization of water in the regenerator is reduced. The catalyst demetallization treatment rates will be permitted to increase significantly since an excessive steam rate will not be reached as quickly as it would if more water were present. The additional advantages of the procedure of the present invention are several, e.g. the wet catalyst is dried inexpensively with regenerator heat; the catalyst is raised from a lower pressure, for example, atmospheric, and lower elevation to the regenerator at higher elevation, for example 40 to 50 feet, and a higher pressure, for example, 15 to 25 p.s.i. higher, pressure for re-entry into the hydrocarbon conversion units; and catalyst which has been chlorinated is stripped in the regenerator of entrained chloride before the catalyst contacts the hydrocarbon oil being converted.

The problem of excess steam can be appreciated when it is realized that catalyst regeneration to remove coke by burning is generally performed at elevated temperatures in the range of about 900° to 1200° F. Pumping excessively wet catalyst into the regenerator at these temperatures imposes a risk of rupturing the catalyst particles by the extreme evolution of steam in the interior pores of the catalyst. In a fluidized bed, for example, the heat transfer rate is high, and drying and steam evolution could occur almost instantaneously.

Generally, catalytically promoted methods for the chemical conversion of hydrocarbons and other chemicals include cracking, hydrocracking, hydrogenation etc. Such reactions can be performed at elevated temperatures, for example, about 300° to 1200° F., more often between about 600° to 1000° F. Feedstocks to these processes comprise normally liquid and solid hydrocarbons which, at the temperature of the conversion reaction, will generally be in the fluid, that is, liquid or vapor state, and the products of the conversion frequently are lower boiling materials.

Although the present invention may be used in conjunction with various catalytic conversion systems employing finely-divided catalyst, it is particularly concerned with the cracking of heavier hydrocarbon feedstock to produce lower boiling hydrocarbons of preferred octane rating, boiling in the gasoline range. This process is widely practiced and uses a variety of solid oxide catalysts. Ordinarily, cracking is effected to produce gasoline as the most valuable product. In cracking, the feedstock is usually a mineral oil or petroleum hydrocarbon fraction boiling above the gasoline range.

Solid oxide catalyst, both naturally occuring, activated catalysts and synthetically prepared gel catalysts, as well as mixtures of the two types, have long been recognized as useful in catalytic promoting conversion of hydrocarbons. For cracking processes, the solid oxide catalyst which have received the widest acceptance today are usually activated or calcined, predominantly silica or silica-based, for example, silica-alumina, silica-magnesia, silica-zirconia, etc., compositions in a state of slight hydration and containing small amounts of acidic oxide promoters in many instances.

The physical form of the catalyst varies with the type of manipulative process to which it will be exposed. In fluidized catalytic processes gases are used to convey the catalyst in the form of a fine powder, generally in a size range of about 20 to 150 microns. The process of this invention is particularly useful in fluidized catalyst systems.

One of the most important phases of the study in the improvement of catalyst performance in hydrocarbon conversion is in the area of poisoning by metals or metal compounds. Various petroleum stocks have been known to contain at least traces of many metals. In addition to metals naturally present, including some iron, petroleum stocks have a tendency to pick up tramp iron from transportation, storage and processing equipment. Because most of these metals, when present in a stock, would deposit in a relatively non-volatile form on the catalyst during the conversion processes and regeneration of the catalyst to remove coke would not remove these contaminants, such feeds are generally avoided. Iron, nickel, vanadium and copper, for example, markedly alter the selectivity and activity of cracking reactions, if allowed to accumulate, producing a higher yield of coke and hydrogen at the expense of desired products, such as gasoline and butanes. The above-mentioned patent application discloses techniques which have been designed for demetallizing catalysts used in the chemical conversion of hydrocarbon oils containing metal poisons and the particular technique is explained in detail in the said application.

In cracking, coke yield may be held to a minimum through the use of good steam stripping and a high steam partial pressure in the reactor and the catalyst surface may be kept reasonably free of metal poisons by demetallization. Ordinarily, the catalysts are treated for demetallization before the poisoning metals have reached an undesirably high level, for instance, about 2%, generally no more than about 1%, maximum content of vanadium, nickel and/or iron. Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 900° to 1200° F. as mentioned, more usually about 1000° to 1150° F. Combustion of coke from the catalyst is rapid, and for reasons of economy generally only enough air is used to supply the needed oxygen. Average residence time for a portion of catalyst in the regenerator may be on the order of about six minutes, and the oxygen content of the effluent gases from the regenerator is desirably less than about 5%, preferably less than 2%. The severity of regeneration may be such that the catalyst sent to demetallization, if regenerated, contains not more than about 0.5% carbon. The catalyst may be removed from a cracking system—that is, the stream of catalyst which is cycled between hydrocarbon conversion and regenerating operations—before the poison content reaches about 5000 to 10,000 p.p.m., the poisoning metals being calculated as their common oxides. Generally, at least about 250 to 500 p.p.m. vanadium and/or at least about 100 or 200 p.p.m. nickel will be accumulated on the catalyst before demetallization is warranted. With a continuously circulating catalyst stream, such as in the ordinary "fluid" system, a slip-stream of catalyst may conveniently be removed intermittently or continuously from the regenerator standpipe. The catalyst is subjected to one or more demetallization procedures and then the catalyst, substantially reduced in contaminating metal content by liquid aqueous treatment is, filtered, reslurried with water and returned to the regenerator.

In the demetallization treatment to take poisoning metals from the cracking catalyst a large or small amount of metal can be removed as desired. The amount of poisoning metal that is removed from the catalyst depends on the amount of poison which can be tolerated, for example, where a cracking unit can tolerate 100 p.p.m. Ni and the demetallization process removes 50% of the metals, only 50 p.p.m. Ni is removed in each demetallization, but where a unit can tolerate 500 p.p.m., 250 p.p.m. may be removed each time the poisoned catalyst is sent through the demetallization unit. The tolerance of the unit for poison is determined, for example, by the loss of yield due to poisoning compared to the cost of enlarged demetallization facilities. When treating the catalyst it is preferred to remove at least about 10% up to about 80% or 90% or more of one or more of the metals in question. The demetallization rate may be about 20–200% of catalyst inventory daily, that is, within a 24-hour period, more than about ⅕ of the amount of catalyst in the system is subjected to the demetallization and sometimes, when it is necessary, twice the amount of catalyst in the system is subjected to one or more of the demetallization procedures. The same amount of catalyst is, of course, usually returned to the regenerator using the process of this invention. Where continuous demetallization is employed, the return to the regenerator may also be continuous, but the process of the invention may be employed also in batch return of the catalyst.

The invention will be better understood by reference to the accompanying drawing which represents diagrammatically a hydrocarbon cracking unit provided with means for catalyst demetallization incluiding an aqueous medium wash, and return of the catalyst to the regenerator according to the present invention.

The sole figure shows a fluidized catalytic cracking reactor 10 which is provided with a feed line 12 for introduction of synthetic gel, silica-alumina cracking catalyst and a hydrocarbon gas oil feedstock. The reactor is also provided with the exit line 14 for the removal of cracked product hydrocarbons, including gasoline, which are generally in a vapor state. The reactor is also provided with the standpipe 16 for the removal of catalyst which is in need of regeneration. This catalyst is conveyed from standpipe 16 through pipe 18 conveniently by air from the source 20 to the regenerator 22. In the regenerator this air, with, if desired, additionally-introduced air, burns coke from the catalyst. The regenerator is also provided with the vent 24 for removal of exhaust gases. Regenerator standpipe 26 is provided for removal of regenerated catalyst from the combustion zone maintained in the regenerator. This catalyst may be conveyed by feed hydrocarbon from the source 48 through the pipe 12 to the reactor.

The regenerator standpipe 26 is provided also with the tap-line 30 whereby a selected amount of catalyst may be conveyed through pipe 32 to the demetallization system.

The demetallization system shown includes means for oxygen-containing gas treatment, sulfiding, chlorinating, washing, filtering, and rinsing the poisoned catalyst as disclosed in the above-mentioned copending applications. The pipe 32 conveys catalyst in a stream of air to the calciner 31 where the catalyst is treated at an elevated temperature to enhance subsequent vanadium removal. Next the catalyst passes by line 33 to the sulfider 34 wherein the catalyst, at an elevated temperature, is subjected to the action of a sulfiding gas, for example, hydrogen sulfide, from the source 36, to enhance later nickel removal. Catalyst is withdrawn from the sulfider by pipe 38, and exhaust gases are removed by line 40.

Catalyst is then conveyed to the chlorinator 42 wherein it is contacted with a chlorinating vapor, for example, a mixture of chlorine gas and carbon tetrachloride, from the source 44. Exhaust gases are withdrawn from the chlorinator by line 46, and catalyst gravitates out of the chlorinator by line 48 to the slurry tank 50 where it is contacted with a liquid aqueous medium, for example, water, from the source 51. In other procedural schemes the compartment may provide for contact of the catalyst with other aqueous media, such as a dilute ammonia solution, weak acids, chelating solutions, or aqueous reducing agents. The slurry may be conducted by line 54 to the filter 56 from which filtrate may be removed by line 58, and catalyst filter cake by line 60. The cake may be brought to the reslurry tank 62 for contact with additional water from the source 64. A plurality of such slurrying, filtering, washing, etc., stages may be provided, but eventually a slurry demetalized catalyst having about 5 parts of water per part of catalyst is conducted through line 66 by centrifugal pump 68 to the elevated holding tank 70 positioned about 2 to 5 feet above the point of entry of demetallized catalyst into the regenerator to provide at least a small gravitational force aiding pump 76. The difference in height between pump 68 and the point of entry into the regenerator 75 is usually about 40 to 50 feet or higher, depending upon the design of the system.

In the holding tank the catalyst slurry is settled and water through filter 72 is returned through line 73 to the reslurry tank to increase the catalyst concentration in the slurry to about 1.5 parts of water per part of catalyst before pumping it into the regenerator 22 through line 74 with progressing cavity pump 76.

By the above described procedure the demetallized catalyst surry is conveyed to the elevated, higher pressure regenerator with a minimum of pump wear and yet the operation of the regenerator is not upset, and the advantages are obtained as aforementioned.

Having described our invention, we claim:

1. An improved method for transferring a water-solid catalyst slurry from a lower pressure catalyst washing operation to a regeneration zone of elevated pressure and at an elevated position which comprises the steps of forming an aqueous slurry of the catalyst containing about 2.5 to 9 parts of water per part of catalyst, pumping the slurry from an elevation below said regeneration zone to an intermediate zone at an elevation higher than the point of entry of the catalyst into the regeneration zone, removing at said higher intermediate zone an amount of water from the slurry to provide a mixture of catalyst and water containing about 1.2 to 1.9 parts of water per part of catalyst and at least about 50% less water than is in said formed slurry, and passing said catalyst- water mixture to said regeneration zone by way of said lower point of entry.

2. The method of claim 1 wherein the slurry is pumped to the intermediate zone by centrifugal action.

3. The method of claim 2 wherein the catalyst-water mixture is passed from the intermediate zone to the regeneration zone by progressing-cavity action.

References Cited by the Examiner

UNITED STATES PATENTS 2,414,736   1/1947   Gray _____ 208—113

DELBERT E. GANTZ, *Primary Examiner.*

A. RIMENS, *Assistant Examiner.*